United States Patent [19]
Isono et al.

[11] 3,893,001
[45] July 1, 1975

[54] PULSED POWER SUPPLY CIRCUIT FOR A LIGHT-EMITTING DISCHARGE TUBE

[75] Inventors: Tomoyuki Isono; Tetsuo Ohmiya, both of Tokyo, Japan

[73] Assignee: Nippon Electric Company, Limited, Tokyo, Japan

[22] Filed: Dec. 19, 1973

[21] Appl. No.: 426,171

[30] Foreign Application Priority Data
Dec. 26, 1972  Japan.................................... 47-693

[52] U.S. Cl................ 315/287; 315/226; 307/252 J
[51] Int. Cl. .......................................... H05b 41/24
[58] Field of Search ............ 315/94, 104, 102, 226, 315/362, 287, 246; 307/252 J, 252 L

[56] References Cited
UNITED STATES PATENTS
3,175,166  3/1965  Bird ............................. 307/252 J X
3,553,495  1/1971  Shaugnessy ......................... 307/284

*Primary Examiner*—Nathan Kaufman
*Attorney, Agent, or Firm*—Sughrue, Rothwell, Mion, Zinn and Macpeak

[57] ABSTRACT

A power supply circuit for a light emitting discharge tube such as an ultraviolet lamp to be intermittently energized by application thereto of a voltage originating from a D.C. power source and characterized by zero level portions which temporarily occur during each cycle. First and second SCR's (thyristor), adapted to be alternately triggered, are connected in parallel across the D.C. source. A series combination of the discharge tube and parallel-connected third and fourth SCR's is connected between the anodes of the first and second SCR's. The third and fourth SCR's are connected with their polarities reversed and are adapted to be alternately triggered a predetermined time after the triggering of the first and second SCR's respectively. Triggering of the third and fourth SCR's establishes an energizing circuit for the discharge tube through the respective one of the first and second SCR's which is held conductive.

3 Claims, 3 Drawing Figures

3,893,001

PULSED POWER SUPPLY CIRCUIT FOR A LIGHT-EMITTING DISCHARGE TUBE

BACKGROUND OF THE INVENTION

This invention relates to a pulsed power supply circuit for intermittently energizing a light emitting discharge tube at a high repetition frequency.

A conventional power supply circuit for an ordinary fluorescent lamp comprises a transistorized inverter circuit or an SCR (thyristor) inverter circuit as a means for producing an AC power signal.

On the other hand, in a color discriminating system of the type disclosed in our copending U.S. Pat. application Ser. No. 417,839, which is a continuation-in-part of the application Ser. No. 210,907, the pulsed power signal to be supplied to the discharge lamp must have an intermittent zero level portion between every two neighboring pulses so as to achieve high-frequency intermittent light emission to make possible a high-speed distinction between fluorescence and phosphorescence. However, there has not yet been any proposal for such a pulsed power supply circuit which adequately meets the above-mentioned requirement.

It is, therefore, an object of this invention to provide a pulsed power supply circuit suited for energizing a light emitting discharge tube capable of generating pulsed light rays at a high repetition frequency.

SUMMARY OF THE INVENTION

According to this invention, there is provided a pulsed power supply circuit for intermittently energizing a light-emitting discharge tube, comprising: first circuit means having first and second SCR's connected in parallel, said first circuit means being connected to a DC power source; and second circuit means having third and fourth SCR's connected in parallel with their polarities reversed, said second circuit means being connected in series with said light-emitting discharge tube between the anodes of said first and second SCR's. The first and second SCR's are turned on alternately in response to the gate pulse supplied to the gate terminals of the first and second SCR's and the third and fourth SCR's are turned on in response to the gate pulse supplied to the gate terminals of the third and fourth SCR's after the lapse of a predetermined period of time from the turning on of the first or second SCR, whereby the discharge tube is intermittently energized to provide light rays at high repetition frequency.

DETAILED DESCRIPTION OF THE INVENTION

Figure 1:
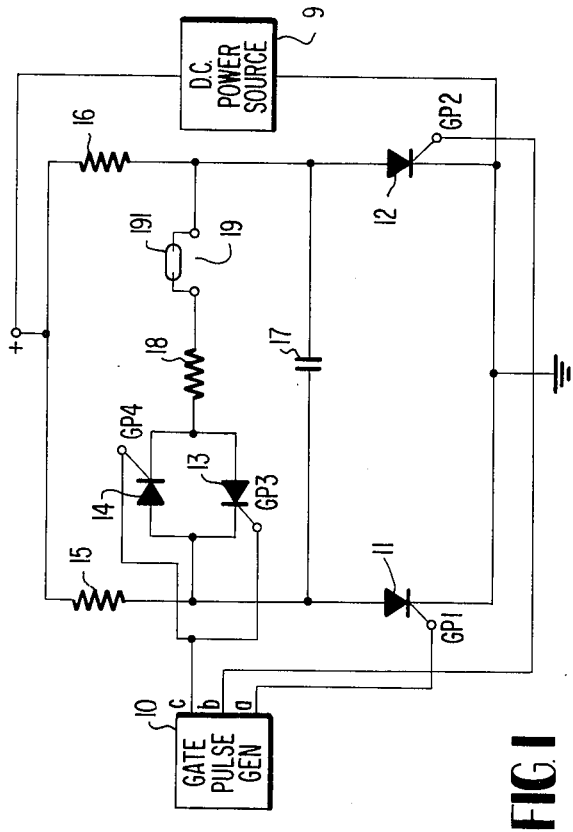
FIG. 1 is a circuit diagram of a first embodiment of this invention.

Referring to FIG. 1, the circuit of the first embodiment comprises a gate pulse generator 10; a first circuit means composed of a first and a second SCR's 11 and 12, resistors 15 and 16 and a capacitor 17; a second circuit means composed of a third and a fourth SCR's 13 and 14, and a resistor 18; and a light-emitting discharge tube 191, such as an ultraviolet lamp, connected to an output terminal 19.

As shown, the first and second SCR's 11 and 12 are connected in series with the resistors 15 and 16, respectively, the series combinations being connected in parallel with each other across a D.C. power source 9. The third and fourth SCR's 13 and 14 are connected in parallel with their polarities reversed, and the parallel combination of the SCR's 13 and 14 is connected in series with the resistor 18 which in turn is connected to the output terminal 19. It is to be noted that the second circuit means is connected between the anodes of the first and second SCR's 11 and 12 which form part of the first circuit means. The SCR's 11, 12, 13 and 14 are connected to the gate pulse generator 10 so as to be supplied with gate pulses therefrom.

Figure 3:
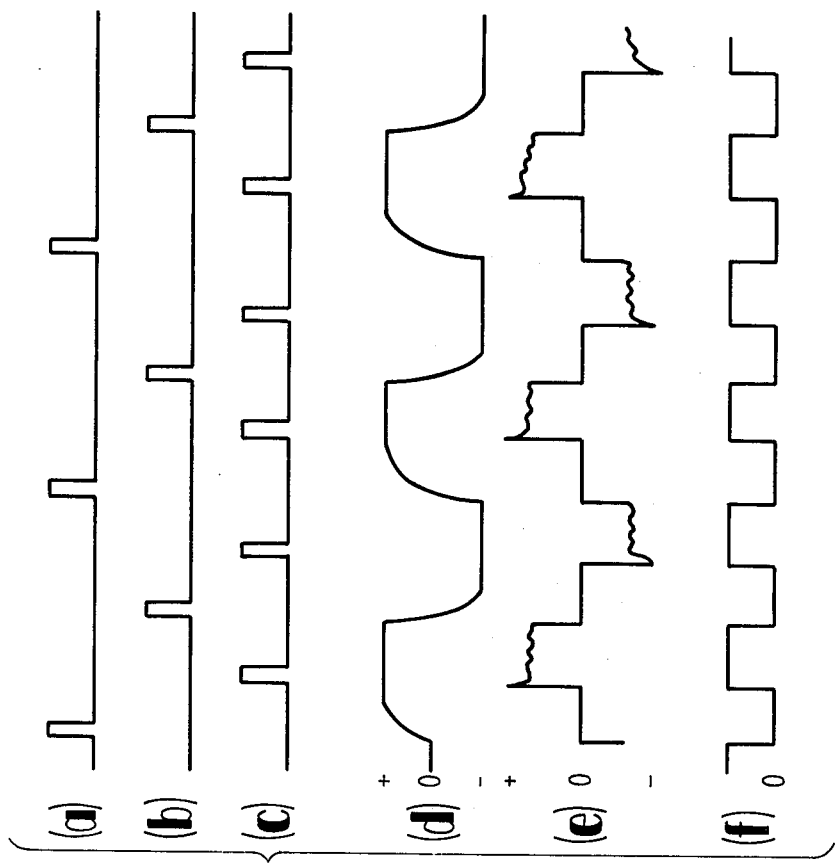
FIG. 3 shows waveforms of signals appearing at various parts of the embodiments.

A first gate pulse ($a$) as shown in FIG. 3($a$) is supplied from the gate pulse generator 10 to a gate terminal GP1 of the first SCR 11. The SCR 11 is turned on as a result, to cause a holding current to flow through the resistor 15 from the DC power source 9. Then, a second gate pulse ($b$) as shown in FIG. 3($b$) is applied from the gate pulse generator 10 to a gate terminal GP2 of the second SCR 12, with a result that the SCR 12 is turned on to permit a holding current therefor to flow through the resistor 16. When this occurs, the first SCR 11 is backward biased by a voltage which has built up across the capacitor 17 and, therefore, remains nonconductive. Thus, it will be understood that the first and second SCR's 11 and 12 are turned on and off, with the voltage ($d$) across the capacitor 17 becoming alternately positive and negative as shown in FIG. 3($d$).

On the other hand, a third gate pulse ($c$) shown in FIG. 3($c$) is supplied from the gate pulse generator 10 to the gate terminals GP3 and GP4 of the third and the fourth SCR's 13 and 14 after the lapse of a predetermined period of time $t$ from the turning on of the first and the second SCR's 11 and 12. When this occurs, assuming that the first SCR 11 is "ON," the third SCR 13 is turned on, with a result that the electric current is allowed to flow through the resistor 16, the ultraviolet lamp 191, the resistor 18, the third SCR 13 and the first SCR 11, causing the ultraviolet lamp 191 to emit pulsed light rays. Then, when the second gate pulse ($b$) is applied to the second SCR 12, the second SCR 12 is turned on, while at the same time, the first SCR 11 is turned off. Therefore, the pulse light rays emitted from the ultraviolet lamp 191 disappear, while the third SCR 13 is turned off. When the third gate pulse ($c$) is applied to the SCR's 13 and 14 under this state, the fourth SCR 14 is turned on, whereby the electric current is caused to flow through the resistor 15, the fourth SCR 14, the resistor 18, the ultraviolet lamp 191 and the second SCR 12, thereby energizing the ultraviolet lamp 191 to emit the light rays. Then, the first gate pulse ($a$) builds up to turn on the first SCR 11 and to turn off the second SCR 12. This temporarily ceases the light emission from the ultraviolet lamp 191. Thus, it will be understood that the pulsed energizing power signal for the lamp 191 has positive, zero, negative and zero voltage states as shown in FIG. 3($e$). As a result, the lamp 191 emits light rays intermittently as depicted in FIG. 3($f$).

In the first embodiment shown in FIG. 1, the holding current for the first SCR 11 for maintaining the first SCR 11 in the "ON" state while the third SCR 13 is in the "OFF" state (with the lamp 191 in the "OFF" state) depends on the resistance of the resistor 15. In this case, a resistor of high resistance can be used as the resistor 15 so that the holding current for the SCR 11 may be minimized. On the other hand, the resistor 15 serves, together with the resistor 18, as a means for controlling the lamp current under the state where the second and the fourth SCR's 12 and 14 are "ON" (with the lamp 191 emitting light rays). Thus, in order to have available increased lamp energizing current, the resistor 15 must be of low resistance. Similarly, the resistor 16 also must be of low resistance. However, this would invite an increase of the holding currents for SCR's 11 and 12 with the undesired result of increased power consumption. This means that the capacity of the DC power source and the SCR must be high. The second embodiment of this invention shown in FIG. 2 provides an improvement in this respect.

Figure 2:
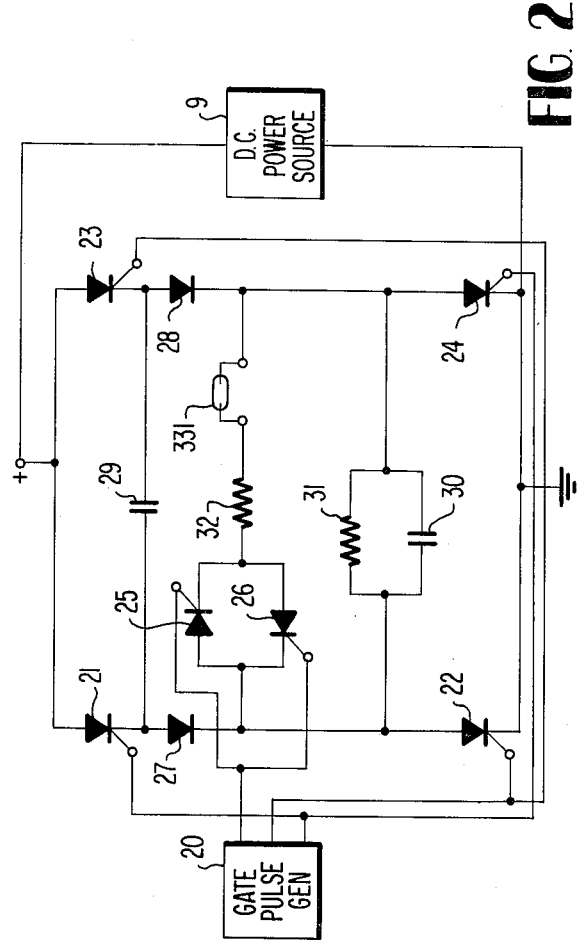
FIG. 2 is a circuit diagram of a second embodiment of this invention.

Referring to FIG. 2, it will be seen that a series combination of an SCR 21, 23 and a diode 27, 28 is employed in place of the resistor 15, 16, respectively (shown in FIG. 1). Further, in order to provide a current path for the holding current of the SCR's 21 through 24, a resistor 31 is connected between the anodes of the SCR's 22 and 24. Capacitors 29 and 30 are provided to perform a function similar to the capacitor 17 shown in FIG. 1. The gate pulse (a) is applied from a gate pulse generator 20 to the gate terminals of the SCR's 21 and 24, which are then turned on to cause the holding current to flow through the SCR 21, a diode 27, the resistor 31 and the SCR 24. After the lapse of a predetermined period of time $t$ from the turning on of the SCR's 21 and 24, the third gate pulse (c) is applied to the gate terminals of SCR's 25 and 26. The SCR 25 is then turned on to cause the lamp current to flow through the SCR 21, the diode 27, the SCR 25, a resistor 32, an ultraviolet lamp 331 and the SCR 24. Thus, the ultraviolet lamp 331 emits the light rays. Gate pulse (b) is then applied to the gate terminals of the SCR's 23 and 22 to turn them on, causing the holding current to flow through the SCR 23, a diode 28, the resistor 31 and the SCR 22. Under this state, the reverse voltage is applied to the SCR 25 to maintain it in the "OFF" state. Furthermore, the SCR's 21 and 24 are backward biased by the capacitors 29 and 30, respectively, and so they are in the "OFF" state. After the lapse of the time $t$, the third gate pulse (c) is applied to the gate terminals of the SCR's 25 and 26, whereby the SCR 26 is turned on, causing the lamp current to flow through the SCR 23, the diode 28, the lamp 331, the resistor 32, the SCR's 26 and 22.

Thus, the power signal as shown in FIG. 3(e) is supplied to the ultraviolet lamp 331, which is caused to intermittently emit the light rays in the manner depicted in FIG. 3(f).

In the second embodiment shown in FIG. 2, the holding current depends only on the resistor 31 and is not affected by the resistor 32. Similarly, the lamp energizing current depends on the resistor 32 but not on the resistor 31. Therefore, the resistor 31 may be of high resistance and the resistor 32 may be of low resistance.

What is claimed is:

1. A pulsed power supply circuit for intermittently energizing a light emitting discharge tube, comprising:
   first circuit means including first and second SCR's connected in parallel and first and second resistors connected respectively in series with said first and second SCR's, said first circuit means being connected to a DC power source;
   second circuit means including third and fourth SCR's connected in parallel with their polarities reversed, said second circuit means being connected in series with said discharge tube between said first and second SCR's;
   means for alternately triggering said first and second SCR's;
   a capaciter connected between said first and second SCR's; and
   means for alternately triggering said third and fourth SCR's a predetermined time after the triggering of said first and second SCR's, respectively, thereby establishing an energizing circuit for said discharge tube.

2. A pulsed power supply circuit for intermittently energizing a light emitting discharge tube, comprising:
   first circuit means including first and second SCR's connected in parallel, said first circuit means being connected to a DC power source;
   second circuit means including third and fourth SCR's connected in parallel with their polarities reversed, said second circuit means being connected in series with said discharge tube between said first and second SCR's;
   means for alternately triggering said first and second SCR's;
   a capacitor connected between said first and second SCR's;
   a resistor connected in parallel with said capacitor between said first and second SCR's;
   third circuit means including fifth and sixth SCR's connected respectively in series with said first and second SCR's and adapted to be alternately triggered simultaneously with the triggering of said second and first SCR's, respectively; and
   means for alternately triggering said third and fourth SCR's a predetermined time after the triggering of said first and second SCR's, respectively, thereby establishing an energizing circuit for said discharge tube.

3. The circuit as defined in claim 2, further comprising a first diode connected between said first and fifth SCR's, a second diode connected between said second and sixth SCR's, and a second capacitor having one terminal connected to a point between said fifth SCR and said first diode and the other terminal connected to a point between said sixth SCR and said second diode.

* * * * *